(12) United States Patent
Tamura

(10) Patent No.: US 8,480,237 B2
(45) Date of Patent: Jul. 9, 2013

(54) PROJECTOR, ELECTRONIC APPARATUS, AND METHOD OF CONTROLLING PROJECTOR

(75) Inventor: Akihiko Tamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 651 days.

(21) Appl. No.: 12/388,860

(22) Filed: Feb. 19, 2009

(65) Prior Publication Data

US 2009/0207323 A1  Aug. 20, 2009

(30) Foreign Application Priority Data

Feb. 19, 2008  (JP) .................................. 2008-036979

(51) Int. Cl.
*G03B 21/14* (2006.01)
*G03B 21/00* (2006.01)
*H04N 3/23* (2006.01)

(52) U.S. Cl.
USPC ........................................... 353/70; 348/746

(58) Field of Classification Search
USPC ................ 353/69, 70, 46, 121, 122; 348/745, 348/746
See application file for complete search history.

(56) References Cited

U.S. PATENT DOCUMENTS

| 7,014,323 | B2 * | 3/2006 | Kobayashi et al. | ............. 353/69 |
| 7,401,929 | B2 | 7/2008 | Matsumoto et al. | |
| 2005/0162445 | A1 * | 7/2005 | Sheasby et al. | ............... 345/620 |
| 2006/0038962 | A1 * | 2/2006 | Matsumoto et al. | ............ 353/69 |
| 2008/0252860 | A1 | 10/2008 | Matsumoto et al. | |
| 2009/0015730 | A1 | 1/2009 | Arakawa | |

FOREIGN PATENT DOCUMENTS

| CN | 1713069 A | 12/2005 |
| JP | A-2003-198995 | 7/2003 |
| JP | A-2006-201673 | 8/2006 |
| JP | A-2007-215029 | 8/2007 |

* cited by examiner

*Primary Examiner* — William C Dowling
*Assistant Examiner* — Ryan Howard
(74) *Attorney, Agent, or Firm* — Oliff & Berridge, PLC

(57) ABSTRACT

A projector includes a light modulation section provided with a plurality of pixels arranged, and adapted to modulate light from a light source by the pixel, and when executing a keystone distortion correction on an image to be projected on a projection surface in response to an operation of an operation section, a maximum pixel area, which is a maximum area in which an image of the light modulation section is formed, and an image forming area in which the image to be the object of the keystone distortion correction is formed are projected simultaneously on the projection surface.

14 Claims, 15 Drawing Sheets

FIG. 2

| TYPE OF IMAGE | ASPECT RATIO | SIZE | LOCATION |
|---|---|---|---|
| CINEMAS | 16:9 (WIDE) | 80 INCHES | X=960,Y=540 |
| NEWS | 4:3 (REGULAR) | 40 INCHES | X=430,Y=322 |
| HOME-SHOT VIDEOS | 4:3 (REGULAR) | 67 INCHES | X=720,Y=540 |

12A

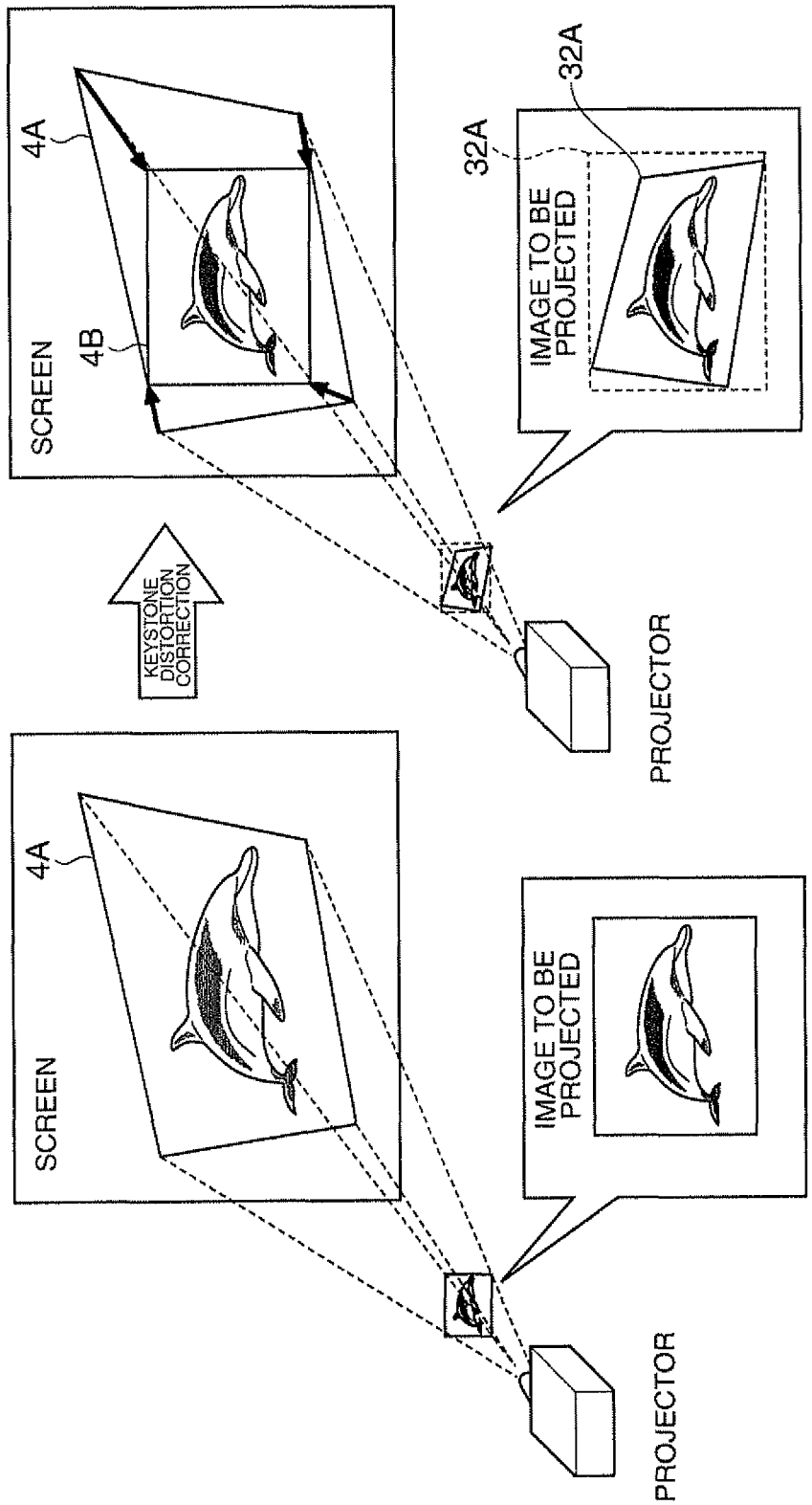
FIG. 7B IMAGE WITH KEYSTONE DISTORTION CORRECTION
FIG. 7A IMAGE WITHOUT CORRECTION

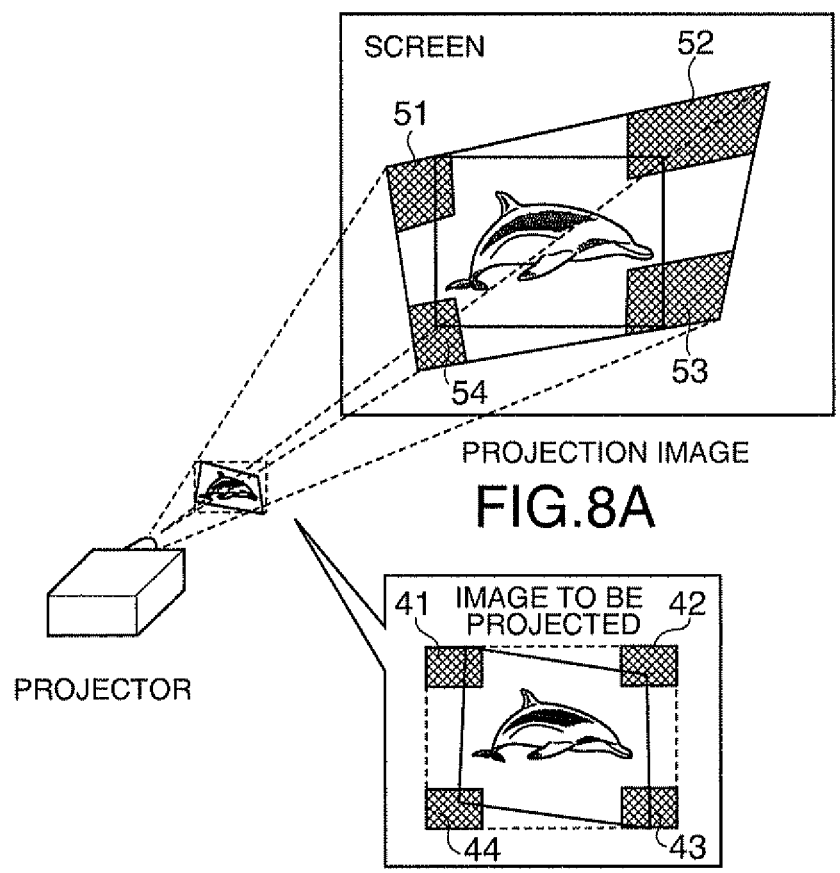
FIG.8A PROJECTION IMAGE
FIG.8B IMAGE WITH KEYSTONE DISTORTION CORRECTION

PROJECTION IMAGE

IMAGE WITH KEYSTONE DISTORTION CORRECTION

PROJECTOR, ELECTRONIC APPARATUS, AND METHOD OF CONTROLLING PROJECTOR

BACKGROUND

1. Technical Field

The present invention relates to a projector adapted to project an image on a projection surface, an electronic apparatus equipped with the projector, and a method of controlling the projector.

2. Related Art

In the case of projecting a still image or a moving image on a screen with a projector such as a projection display device, the image is distorted to have a trapezoidal shape unless a light source of the projector and the projection surface of the screen perpendicularly face to each other. In the past, a projector correcting the trapezoidal distortion (so-called keystone distortion) of the image has been known (see e.g., JP-A-2003-198995 (Document 1)).

Incidentally, the keystone distortion correction is performed by deforming an image having a substantially rectangular shape displayed on a light modulation section such as an LCD so that the image projected on the projection surface becomes to have a rectangular shape, and a deformable range of the image displayed on the light modulation section is limited. However, in the technology disclosed in the Document 1, since such a deformable range is not figured out, there arises a problem that how the keystone distortion correction can be performed is not figured out. In particular, in the case of the keystone distortion correction of individually adjusting the four apexes, since it is not figured out how to adjust each of the apexes, there arises a problem that the adjustment is difficult.

SUMMARY

The invention has an advantage of easily and simply correcting the keystone distortion in a projector adapted to project an image.

In view of the problems described above, a first aspect of the invention is directed to a projector including a light modulation section provided with a plurality of pixels arranged, and adapted to modulate light from a light source by the pixel, wherein when executing a keystone distortion correction on an image to be projected on a projection surface in response to an operation of an operation section, a maximum pixel area, which is a maximum area in which an image of the light modulation section is formed, and an image forming area in which the image to be the object of the keystone distortion correction is formed are projected simultaneously on the projection surface.

According to the configuration described above, when operating the operation section to perform the keystone distortion correction, the maximum pixel area as the maximum area in which the image of the light modulation section can be formed and the image forming area in which the image to be the object of the keystone distortion correction is formed are simultaneously projected on the projection surface. Therefore, since the correctable range can be learned, the keystone distortion can simply and easily be corrected.

A second aspect of the invention is directed to the projector of the first aspect of the invention, wherein the projector projects a correction limit range indicating a limit range of correction for shrinking the image, and having a rectangular shape on the projection surface when executing the keystone distortion correction.

According to the configuration described above, when executing the keystone distortion correction, the correction limit range is projected on the projection surface. As a result, since it is possible to learn the range to which the image can be shrunk, the keystone distortion correction can simply and easily be performed.

A third aspect of the invention is directed to the projector of the second aspect of the invention, wherein the projector projects a figure indicating an apex of the correction limit range and an apex of the maximum pixel area on the projection surface.

According to the configuration described above, the figure indicating the apex of the correction limit range and the apex of the maximum pixel area is projected on the projection surface. As a result, since it is possible to learn the maximum range and the minimum range to which the image can be corrected, the keystone distortion correction can simply and easily be performed.

A fourth aspect of the invention is directed to the projector of the third aspect of the invention, wherein the projector projects a rectangular area having the apex of the correction limit range and the apex of the maximum pixel area as a pair of diagonal angles on the projection surface as an area in which the apex of the image can move.

According to the configuration described above, the range in which the apex of the image can move is projected. As a result, since it is possible to learn the movable range of the apex when designating the apex of the image to perform the keystone distortion correction, the keystone distortion correction can simply and easily be performed.

A fifth aspect of the invention is directed to the projector of the fourth aspect of the invention, wherein the projector projects a figure indicating the apex of the image on the projection surface.

According to the configuration described above, the figure indicating the apex of the image is projected on the projection surface. As a result, since the apex of the image is indicated clearly, it is possible to surely learn the apex location in the movable range of the apex, thus the keystone distortion correction can simply and easily be performed.

A sixth aspect of the invention is directed to the projector of any one of the first through the fifth aspects of the invention, wherein the projector sets an area obtained by excepting the image forming area from the maximum pixel area of the light modulation section to be in a non-projection state when the keystone distortion correction is terminated.

According to the configuration described above, when the keystone distortion correction is terminated, the area obtained by excepting the image forming area from the maximum pixel area is set to be in the non-projection state. Therefore, by preventing the projection of the unnecessary area, the visibility of the image projected can be enhanced.

A seventh aspect of the invention is directed to an electronic apparatus equipped with the projector of any one of the first through the sixth aspects of the invention.

According to the electronic apparatus of the configuration described above, substantially the same function and advantage as those of the projectors of the first through the sixth aspects of the invention can be obtained.

In view of the problems described above, an eighth aspect of the invention is directed to a method of controlling a projector including a light modulation section provided with a plurality of pixels arranged, and adapted to modulate light from a light source by the pixel, the method including projecting, when executing a keystone distortion correction on an image to be projected on a projection surface in response to an operation of an operation section, a maximum pixel area, which is a maximum area in which an image of the light modulation section is formed, and an image forming area in which the image to be the object of the keystone distortion correction is formed, simultaneously on the projection surface.

According to the configuration described above, when operating the operation section to perform the keystone distortion correction, the maximum pixel area as the maximum area in which the image of the light modulation section can be formed and the image forming area in which the image to be the object of the keystone distortion correction is formed are simultaneously projected on the projection surface. Therefore, since the correctable range can be learned, the keystone distortion can simply and easily be corrected.

BRIEF DESCRIPTION OF THE DRAWINGS

The invention will now be described with reference to the accompanying drawings, wherein like numbers reference like elements.

FIG. 2 is a diagram showing a configuration example of a projection condition table stored in a storage section.

FIGS. 7A and 7B are a diagram showing an example of correspondence between the display condition of the liquid crystal light valve and a projection image.

FIGS. 8A and 8B are a display example of an apex movable area.

DESCRIPTION OF EXEMPLARY EMBODIMENTS

An embodiment to which the invention is applied will hereinafter be explained with reference to the drawings.

Figure 1:
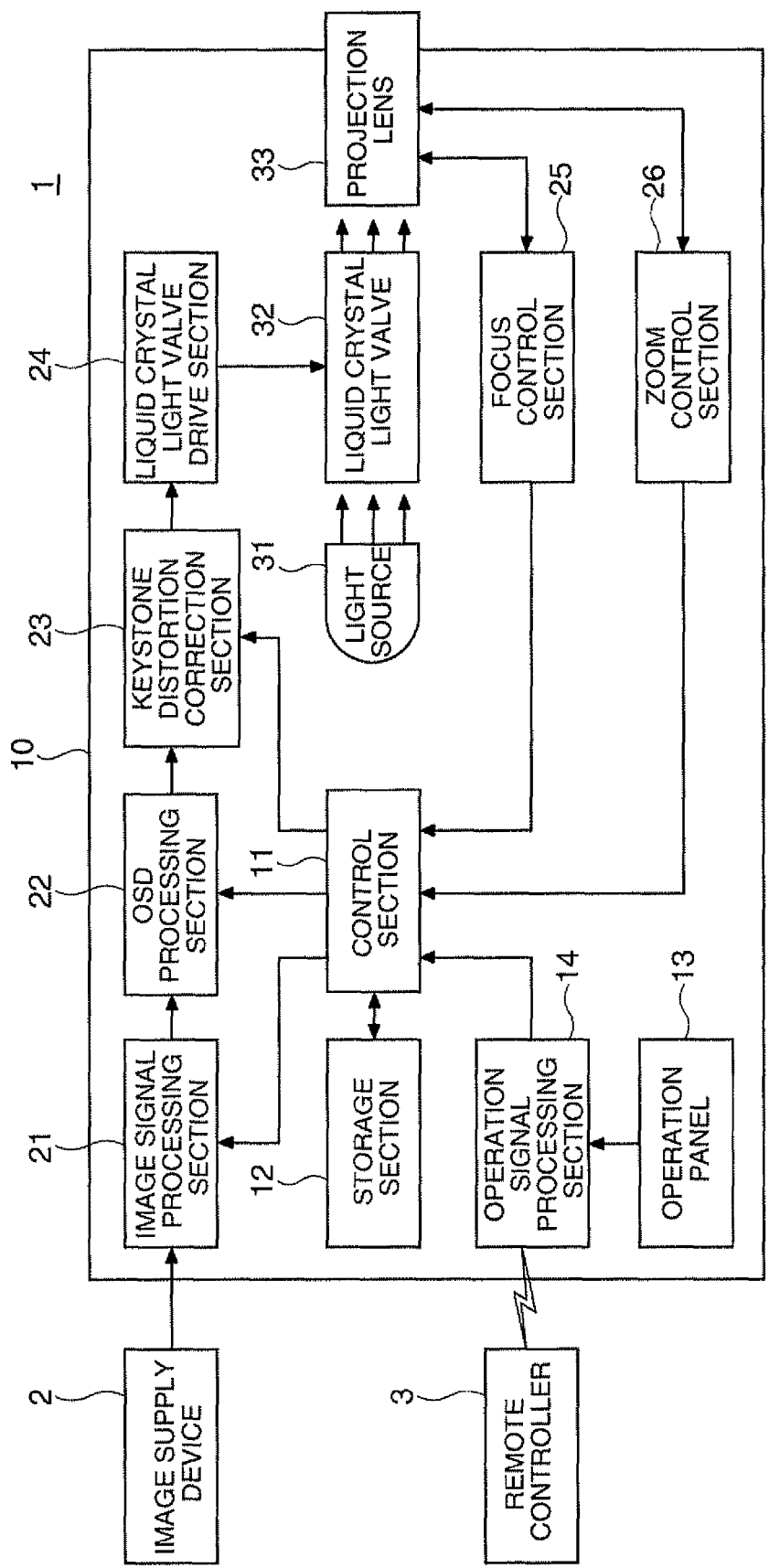
FIG. 1 is a block diagram showing a configuration of a projector system according to an embodiment.

FIG. 1 is a block diagram showing a schematic configuration of a projector system 1 according to the present embodiment.

The projector system 1 is configured including an image supply device 2 for outputting an image signal, and a projector 10 for projecting an image based on the image signal output from the image supply device 2. The image projected by the projector system 1 can be a still image or a moving image, and the image in the following explanations can include both of the still image and the moving image.

The projector 10 is provided with a control section 11 for controlling each section of the projector 10, and the control section 11 reads out a control program stored in a storage section 12 to execute the control program, thereby realizing various functions of the projector 10. Here, although the control section 11 forms the projector 10 itself, it is possible to consider that the control section 11 functions as a control device of the projector 10.

The projector 10 is provided with an operation panel 13 (corresponding to a "operation section" in the appended claims) having operation knobs operated by the user, such as switches and buttons, and an operation signal processing section 14 for generating an operation signal in accordance with the operation in the operation panel 13 and outputting the operation signal to the control section 11. Further, the operation signal processing section 14 is provided with a function of receiving a wireless signal transmitted by a remote controller 3 (corresponding to the "operation section" in the appended claims) operated by the user to detect the operation in the remote controller 3, and generates the operation signal corresponding to the operation of the remote controller 3 to output the operation signal to the control section 11.

The storage section 12 stores the control program the control section 11 executes, and at the same time, stores various kinds of setting values or the like related to the operation of the projector 10. As the various kinds of setting values stored in the storage section 12, there can be cited, for example, information representing the size and the location of the image the projector 10 projects.

FIG. 2 is a diagram schematically showing the configuration of a projection condition table 12A as an example of the information stored in the storage section 12.

The projection condition table 12A shown in FIG. 2 stores projection condition information including information representing the size of the image to be projected and information representing the location of the image corresponding to each other for each type of image. In the example of FIG. 2, the projection condition table 12A stores the projection condition information for each of three types of images. For example, in the projection condition information corresponding to cinemas, the image size (display size) is 80 inches in diagonal size, and the image location is defined as (X,Y)= (960,540).

Here, the image location is represented as a relative location using an X-Y orthogonal coordinate system imaginarily provided, as described later, on the projection surface of a screen 4 (corresponding to a "projection surface" in the appended claims) (FIGS. 3A to 3C) on which the projector 10 projects an image. The X-Y orthogonal coordinate system is developed along the projection surface with the center of the screen 4 as the origin O, and is composed of an X-axis extending in a lateral direction of the projection surface, namely the long-side direction, and a Y-axis extending in a vertical direction of the projection surface, namely the short-side direction. The image location in the projection condition table 12A is a position coordinate of the upper right corner of the image in the X-Y orthogonal coordinate system described above.

Further, in the projection condition table 12A, the image size in the projection condition information corresponding to news is set to be 40 inches in diagonal size, and the image location is set as (X,Y)=(430,322). In the projection condition information corresponding to home-shot videos, the image size is set to be 67 inches in diagonal size, and the image location is set as (X,Y)=(720,540).

The projection condition table 12A is used for allowing the user to designate the image size and the image location with a simple operation. Specifically, the user is allowed to designate the image size and the image location to the projector 10 by selecting either one of the plurality of pieces of projection condition information included in the projection condition table 12A. Further, as shown in FIG. 2, in order for providing the user with useful information in selecting the projection condition information, it is possible to adopt a configuration of the projection condition table 12A including aspect ratios of the images. Further, for the same purpose, it is also possible to include the information representing the signal types (e.g., 1080i, 1080p, and 540p) of images as well as the types of images in the projection condition table 12A.

Here, the image location can be determined not only as the coordinate location in the projection surface of the screen 4, but also as a relative location based on the vertical size Sy and the lateral size Sx of the image. For example, it is possible to express the location moved a fourth of the vertical size Sy upward from the reference position as +Sy/4, and the location moved a fourth of the lateral size Sx rightward from the reference position as +Sx/4.

The storage section 12 in the present embodiment stores the image size S0 (e.g., 60 inches) and the image location (X0,Y0)=(±0,±0) as initial values. According to the initial values, an image with the size of S0 inch is displayed at the center of the projection surface of the screen 4.

Further, as shown in FIG. 1, the projector 10 is provided with an image processing section composed mainly of an image signal processing section 21 for processing an image signal along the control by the control section 11, an OSD processing section 22, and a keystone distortion correction section 23.

Figure 3C:
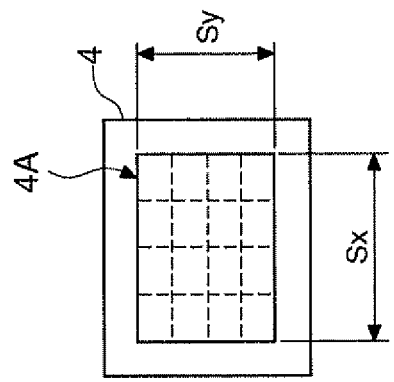
FIGS. 3A through 3C are diagrams showing a relationship between an installation condition of the projector and a projection condition.
Figure 3B:
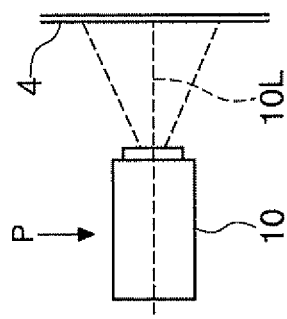
Figure 3A:
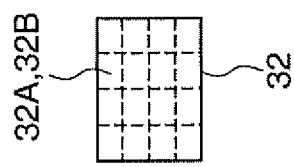

Further, the projector 10 is provided with an optical system including a light source 31 (corresponding to a "light source" in the appended claims) having a light emitter, a liquid crystal light valve 32 (corresponding to a "light modulation section" in the appended claims) for modulating the light the light source 31 emits, and a projection lens 33 for projecting the light, which is transmitted through the liquid crystal light valve 32, towards the screen 4 (FIGS. 3A to 3C). Still further, the projector 10 is provided with an optical drive section including a liquid crystal light valve drive section 24 for driving the liquid crystal light valve 32, a focus control section 25 for driving the projection lens 33 to perform a focus adjustment, and a zoom control section 26 for driving the projection lens 33 to perform a zoom adjustment.

Along the control by the control section 11, the image signal processing section 21 executes various processes, such as an A/D conversion process or a resolution conversion process for matching the resolution of the image signal with the resolution of the liquid crystal light valve 32, on the image signal input from the image supply device 2, thereby generating a digital image data and outputting the digital image data to the OSD processing section 22.

The OSD processing section 22 generates a composite image data obtained by overlapping the On Screen Display (OSD) image such as characters and symbols representing the operating state of the projector 10, or a menu image used when performing an image quality adjustment, with the image data input from the image signal processing section 21, and outputs the composite image data to the keystone distortion correction section 23.

The keystone distortion correction section 23 corrects the distortion (hereinafter referred to as a keystone distortion) caused when performing projection in the condition in which the projector 10 is tilted with respect to the screen 4. Specifically, the keystone distortion correction section 23 deforms the display shape of the composite image data in order for displaying, on the liquid crystal light valve 32, the composite image data input from the keystone distortion correction section 23 with a shape of compensating the keystone distortion. Further, the keystone distortion correction section 23 outputs the composite image data thus processed to the liquid crystal light valve drive section 24.

The liquid crystal light valve drive section 24 displays the image on a transmissive liquid crystal panel of the liquid crystal light valve 32 based on the composite image data input from the keystone distortion correction section 23.

The focus control section 25 operates a focusing mechanism (not shown) of the projection lens 33 along the control by the control section 11 to operate a focus adjustment. Specifically, the focus control section 25 moves a focusing lens constituting the projection lens 33 in the optical axis direction, thereby adjusting the focus state. It is also possible for the focus control section 25 to detect an adjustment amount of focusing, namely an amount (a focusing amount) of movement of the focusing lens, and in this case, the focus control section 25 outputs the focusing amount thus detected to the control section 11. The detection of the focusing amount can be achieved using a detection mechanism, such as a rotary encoder or a potentiometer, for detecting an amount of rotation of a rotating cam mechanism (not shown) for moving the focusing lens in the optical axis direction. Alternatively, it is also possible to detect the focusing amount based on the number of steps of a stepping motor as a driving source of the focusing mechanism.

Further, the zoom control section 26 operates a zooming mechanism (not shown) provided to the projection lens 33 along the control by the control section 11 to move a zooming lens along the optical axis, thereby varying the zooming or reducing magnification (hereinafter referred to as a zooming rate) of the projection, thus projecting the image with the zooming rate designated by the control section 11. Further, the zoom control section 26 also functions as a zooming amount detection section for detecting the focal distance, namely an amount (a zooming amount) of movement of the zooming lens, and outputs the zooming amount thus detected to the control section 11. Regarding a method of detecting the zooming amount, similarly to the method of detecting the focusing amount, it can be achieved using a detection mechanism, such as a rotary encoder or a potentiometer, for detecting an amount of rotation of a rotating cam mechanism (not shown) for moving the zooming lens in the optical axis direction. Alternatively, it is also possible to detect the zooming amount based on the number of steps of a stepping motor as a driving source of the zooming mechanism.

The light source 31 is configured including, for example, a lamp such as a high-pressure mercury lamp, or another light emitter.

The liquid crystal light valve 32 is formed of a transmissive liquid crystal panel having a plurality of pixels arranged in a matrix. The liquid crystal light valve 32 is driven by the liquid crystal light valve drive section 24, and varies the light transmission in each of the pixels thus arranged in a matrix, thereby forming an image.

Here, in the case in which the projector 10 is configured as a tri-LCD projector, there are disposed three liquid crystal light valves 32 corresponding respectively to three colors of R, G, and B, a prism for distributing and collecting the light from the light source 31, and so on. In the description of the present embodiment, for the sake of convenience of understanding, a configuration provided with one liquid crystal light valve 32 will be explained only as nothing more than one example.

The projection lens 33 is composed mainly of a combination of a lens group including one or more lenses, and has a configuration capable of executing focus adjustment when the focus control section 25 drives projection lens 33. Further, the projection lens 33 has a configuration capable of zooming or reducing the image formed by the light transmitted through the liquid crystal light valve 32 when the zoom control section 26 drives the projection lens 33.

It should be noted that although it is also possible that the optical system of the projector 10 has a configuration including a lens array for adjusting the light distribution, a polarization adjustment element for adjusting the polarization, a mirror, a prism, a dust-proof glass, and so on besides the light source 31, the liquid crystal light valve 32, and the projection lens 33, illustrations and explanations therefor will be omitted here.

Then, the operation of the projector 10 when projecting an image will be explained.

FIGS. 3A through 3C are diagrams showing a relationship between an installation condition of the projector 10 and a projection condition in the screen 4. FIGS. 3A through 3C shows an example of installing the projector 10 on a horizontal plane. FIG. 3A shows a condition of the pixels in the liquid crystal light valve 32, FIG. 3B shows a positional relationship between the projector 10 and the screen 4, and FIG. 3C shows the projection condition on the screen 4.

Figure 4C:
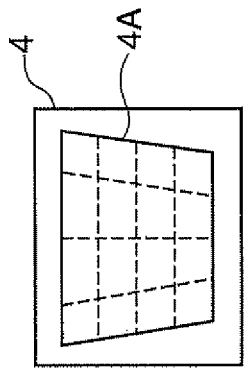
FIGS. 4A through 4C are diagrams showing a relationship between an installation condition of the projector and the keystone distortion.
Figure 4B:
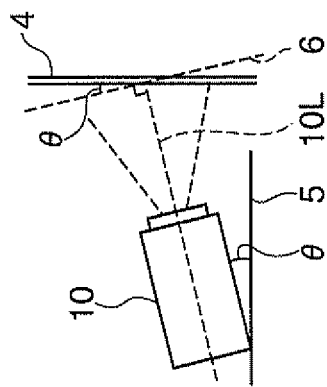
Figure 4A:
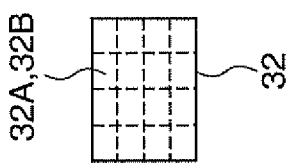
Figure 5C:
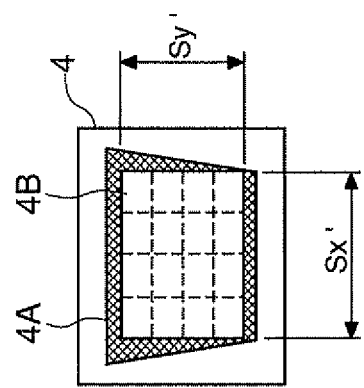
FIGS. 5A through 5C are diagrams showing an example of a display condition of a liquid crystal light valve and the keystone distortion correction.
Figure 5B:
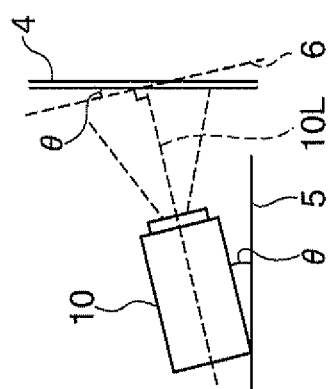
Figure 5A:
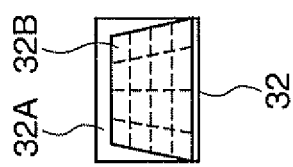

Further, FIGS. 4A through 4C are diagrams showing a relationship between the installation condition of the projector 10 and the keystone distortion of the image projected on the screen 4, and FIGS. 5A through 5C are diagrams showing an example of keystone distortion correction. FIGS. 4A and 5A each show a condition of the pixels in the liquid crystal light valve 32, FIGS. 43 and 5B each show a positional relationship between the projector 10 and the screen 4, and FIGS. 4C and 5C each show the projection condition on the screen 4.

The broken lines illustrating the lattice-like patterns in FIGS. 3A, 3C, 4A, 4C, 5A, and 5C are auxiliary lines added for showing the correspondence between the maximum pixel area 32A as the maximum area where an image of the liquid crystal light valve 32 can be formed and an image forming area 323 as an area where an image is actually formed by transmitting the light, and the maximum projection area 4A as the maximum area of the screen 4 where the projection is possible and an image projection area 4B as an area where the image is actually projected, and do not denote that such lattice-like patterns are actually formed or displayed.

The condition shown in FIGS. 3A through 3C corresponds, for example, to the case in which the projector 10 is implemented on a horizontal plane, and the screen 4 is implemented along the vertical direction. In this example, as shown in FIG. 3B, the optical axis 10L of the projector 10 is perpendicular to the projection surface of the screen 4. In other words, the optical axis 10L and the normal line of the projection surface of the screen 4 are parallel to each other.

Therefore, as shown in FIG. 3A, the image forming area 32B with an oblong shape is set as the maximum pixel area 32A in which the pixels are arranged in the liquid crystal light valve 32, and an image displayed in the image forming area 323 is projected on the maximum projection area 4A with a regular shape. Here, the regular shape generally denotes an oblong with an aspect ratio Sx:Sy of 4:3 or 16:9.

In contrast, in the example shown in FIGS. 4A through 4C, the projector 10 is disposed upward at an angle θ (≠0) with the horizontal installation surface 5, and the optical axis 10L is tilted upward. The projection in a condition in which the optical axis 10L is tilted upward is called "tilted projection," and the angle θ is called a "tilt angle." In the case in which the projection angle of the screen 4 is vertical, the tilt angle θ is equal to the angle formed between the projection surface of the screen 4 and an ideal plane 6 perpendicular to the optical axis 10L.

In the condition shown in FIGS. 4A through 4C, the maximum projection area 4A formed by projecting the oblong image forming area 32B shown in FIG. 4A is distorted to be a trapezoid. This distortion is so called keystone distortion, and the amplitude of the distortion increases in accordance with the tilt angle θ.

Therefore, when the projector 10 performs the keystone distortion correction, the deformed image forming area 32B is used in the liquid crystal light valve 32 as shown in FIG. 5A, thus the keystone distortion of the maximum projection area 4A is canceled. The image forming area 32B shown in FIG. 5A has a trapezoidal shape with a shorter upper side and a longer lower side so as to compensate the distortion (with a longer upper side and a shorter lower side) of the maximum projection area 4A. By deforming the composite image data with the keystone distortion correction section 23 (FIG. 1) so as to fit in with the image forming area 32B to display the deformed composite image data on the image forming area 32B, and projecting the deformed composite image data with the light from the light source 31, the oblong image with the same aspect ratio as the original composite image data is projected as illustrated as the image projection area 43 shown in FIG. 5C. Here, the ratio (the length of the upper side/the length of the lower side) between the upper side and the lower side of the image forming area 32B becomes roughly equal to the inverse of the ratio (the length of the upper side/the length of the lower side) between the upper side and the lower side of the maximum projection area 4A.

Although it is possible to project the image projection area 4B with the regular shape on the screen 4 by performing the keystone distortion correction described above on the one hand, since only a part of the maximum pixel area 32A can be used as the image forming area 32B, the size of the image projected on the screen 4 becomes smaller than the maximum projection area 4A on the other hand. It is obvious that the image projection area 4B is smaller than the maximum projection area 4A. Therefore, when the keystone distortion correction is performed, the image is shrunk providing the zooming rate is constant. It should be noted that although FIG. 5C shows the maximum projection area 4A with hatching for the sake of reference, the hatched part corresponds to a non-transmissive part of the maximum pixel area 32A, and is never viewed actually.

Figure 6C:
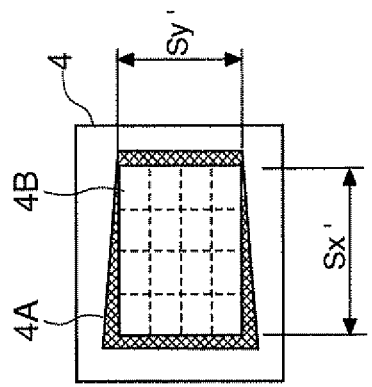
FIGS. 6A through 6C are diagrams showing another example of the display condition of the liquid crystal light valve and the keystone distortion correction.
Figure 6B:
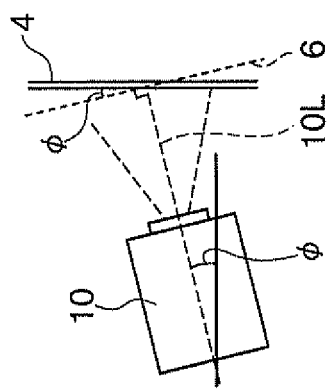
Figure 6A:
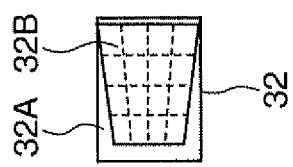

Although FIGS. 4A through 4C, and 5A through 5C show examples of the case in which the projector 10 is implemented upward at the angle θ with respect to the horizontal implementation surface 5, the keystone distortion can be caused in the case in which the projector 10 is implemented while being tilted in the lateral direction (the horizontal direction). FIGS. 6A through 6C are diagrams of the projector 10 shown in FIGS. 3A through 3C and viewed in the direction of the arrow P. In the example shown in FIGS. 6A through 6C, the projector 10 is implemented in the condition of having the optical axis 10L tilted in the horizontal direction at an angle φ (≠0) with the normal line of the projection surface of the screen 4.

In the condition shown in FIGS. 6A through 6C, the maximum projection area 4A formed by projecting the oblong image forming area 32B is distorted in the horizontal direction to be a trapezoid in the same manner as shown in FIG. 4A.

Therefore, when the projector 10 performs the keystone distortion correction, the deformed image forming area 32B is used in the liquid crystal light valve 32 as shown in FIG. 6A, thus the keystone distortion of the maximum projection area 4A is canceled. The image forming area 32B shown in FIG. 6A has a trapezoidal shape with a shorter left side and a longer right side so as to compensate the distortion (with a longer left side and a shorter right side) of the maximum projection area 4A. By deforming the composite image data with the keystone distortion correction section 23 (FIG. 1) so as to fit in with the image forming area 32B to display the deformed composite image data on the image forming area 32B, and projecting the deformed composite image data with the light from the light source 31, the oblong image with the same aspect ratio as the original composite image data is projected as illustrated as the image projection area 4B shown in FIG. 6C. Here, the ratio (the length of the left side/the length of the right side) between the left side and the right side of the image forming area 32B becomes roughly equal to the inverse of the ratio (the length of the left side/the length of the right side) between the left side and the right side of the maximum projection area 4A.

It should be noted that in such keystone distortion correction, the size of the image projected on the screen 4 becomes smaller than the maximum projection area 4A as is the case with the example described above. Although FIG. 6C shows the maximum projection area 4A with hatching for the sake of reference, the hatched part corresponds to a nontransmissive part of the maximum pixel area 32A, and is never viewed actually.

Then, the operation of the embodiment of the invention will hereinafter be explained.

FIGS. 7A, 7B, 8A and 8B are diagrams for explaining a rough outline of the operation of the embodiment of the invention. In the case in which the projector 10 is disposed with tilts in both the horizontal direction and the vertical direction, the keystone distortion is caused in the image projected on the screen 4 in both the lateral direction (the horizontal direction) and the up-and-down direction (the vertical direction), respectively, as shown in FIG. 7A. As shown in FIG. 7B, when the user manually moves the four apexes of the image forming area 32B of the liquid crystal light valve 32 by operating the operation panel 13 and so on, it is possible to perform adjustment so that the image projection area 4B projected on the screen 4 becomes to have a substantially rectangular shape. In this case, in the case of performing the correction for zooming the image, the maximum pixel area 32A becomes the maximum range, and in the case of performing the correction for shrinking the image, a predetermined correction limit range (a rectangular area obtained by shrinking the image while keeping the aspect ratio) becomes the minimum range. In other words, when performing the keystone distortion correction, the correction range of the image is limited within a range between the maximum of the maximum pixel area 32A and the minimum of the correction limit range.

Therefore, in the present embodiment, when performing the keystone distortion correction, as shown in FIG. 8B (and FIG. 11 described later), apex movable areas 41 through 44 as rectangles each having the apex of the maximum pixel area 32A and the corresponding apex of the correction limit range as diagonal apexes are displayed on the four corners of the maximum pixel area 32A of the liquid crystal light valve 32. It should be noted that the apex movable areas 41 through 44 literally represent the ranges in which the apexes of the image can be moved, respectively. As a result, as shown in FIG. 8A, apex movable areas 51 through 54 corresponding respectively to the apex movable areas 41 through 44 are displayed on the screen 4. By referring to such apex movable area 51 through 54, the user can recognize the movable range of the four apexes of the image to be an object of the correction, and perform the adjustment so that the image projection area 4B becomes to have a rectangular shape. Specifically, in the example shown in FIGS. 5A and 5B, since there is a sufficient margin in the lateral direction, and a margin in the vertical direction is small, by performing the adjustment so that the upper left apex has contact with the upper side of the apex movable area 51, and the lower right apex has contact with the lower side of the apex movable area 53, the keystone distortion can be corrected while keeping the size of the image the maximum.

Then, a detailed operation of the present embodiment will be explained with reference to a flowchart shown in FIG. 9. Firstly, when a predetermined image signal is supplied from the image supply device 2, the image signal processing section 21 executes the A/D conversion described above and so on the image signal supplied from the image supply device 2, thereby generating the digital image data, and outputs the digital image data to the OSD processing section 22. The OSD processing section 22 outputs the character information or the like together with the image data in an overlapping manner. The keystone distortion correction section 23 executes the keystone distortion correction on the image data thus output from the OSD processing section 22, and outputs the image data to the liquid crystal light valve drive section 24. Further, the keystone distortion correction section 23 sets an area (hereinafter referred to as a "peripheral area") existing in the periphery of the image forming area 32B to be the non-transmissive state as the normal state, and outputs it to the liquid crystal light valve drive section 24. Specifically, since the image forming area 32B has a smaller size than the size of the maximum pixel area 32A of the liquid crystal light valve 32, the keystone distortion correction section 23 sets the peripheral area to be the non-transmissive state so as not to project the area (=the peripheral area), which is obtained by excepting the image forming area 32B from the maximum pixel area 32A, on the screen 4. It should be noted that since the keystone distortion correction has not been executed yet at this moment, the keystone distortion correction section 23 outputs the image data of the original image without the correction. The liquid crystal light valve drive section 24 displays the image on a transmissive liquid crystal panel of the liquid crystal light valve 32 based on the image data output from the keystone distortion correction section 23. The liquid crystal light valve 32 modulates the white light emitted from the light source based on the pixels of the image displayed, and inputs the modulated light into the projection lens 33. The projection lens 33 projects the light emitted from the liquid crystal light valve 32 on the screen 4. On this occasion, in the case in which the projector 10 has the tilts respectively in the vertical direction and the horizontal direction with respect to the screen 4, an image, which do not have a rectangular shape, and has the keystone distortion as shown in FIG. 7A, is projected on the screen 4.

Figure 9:
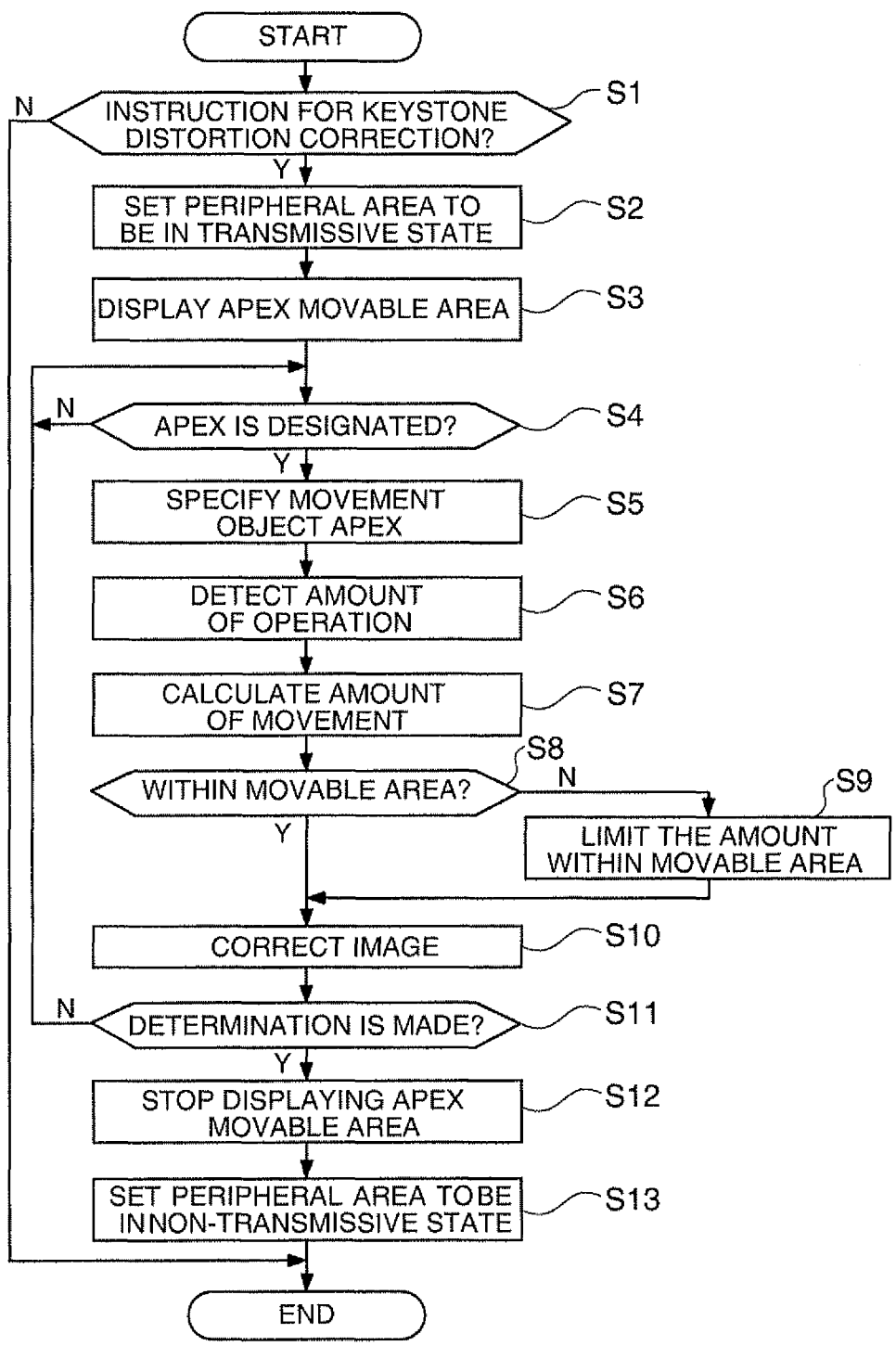
FIG. 9 is a flowchart showing an operation of the projector 10.

In such a case, if the user operates the operation knob for executing the keystone distortion of the operation panel 13 or the remote controller 3, it is determined in the step S1 shown in FIG. 9 that the instruction for keystone distortion correction is made (Yes in the step S1), and the process proceeds to the step S2. It should be noted that if it is determined that the instruction for keystone distortion correction is not made (No in the step S1), the process shown in FIG. 9 is terminated.

Figure 10A:
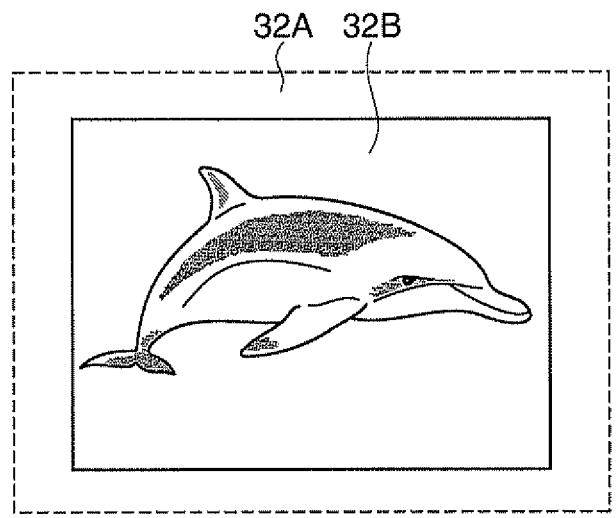
FIGS. 10A and 10B are diagrams showing a display example of the apex movable area in the liquid crystal light valve.

In the step S2, the control section 11 provides the keystone distortion correction section 23 with an instruction for changing the state of the peripheral area existing in the periphery of the image forming area 32B from the non-transmissive state as the normal state to the transmissive state. As a result, the keystone distortion correction section 23 changes the state of the area (=the peripheral area), which is obtained by excepting the image forming area 32B from the maximum pixel area 32A, from the non-transmissive state to the transmissive state. The image data thus generated in the manner described above is supplied to the liquid crystal light valve drive section 24, and displayed on the liquid crystal light valve 32. As a result, since the area of the liquid crystal light valve 32, which is obtained by excepting the image forming area 32B from the maximum pixel area 32A, is set to be in the transmissive state as shown in FIG. 10A, the peripheral area is projected on the screen 4 together with the image corresponding to the image forming area 32B. It should be noted that on this occasion, it is possible to provide the peripheral area with some display color (e.g., blue).

In the step S3, the control section 11 provides the keystone distortion correction section 23 with an instruction for displaying the apex movable areas. In more detail, the control section 11 looks up the projection condition table 12A stored in the storage section 12 to select the projection condition information corresponding to the image signal supplied from the image supply device 2, and provides the keystone distortion correction section 23 with an instruction for displaying the apex movable areas corresponding to the projection condition.

Figure 11:
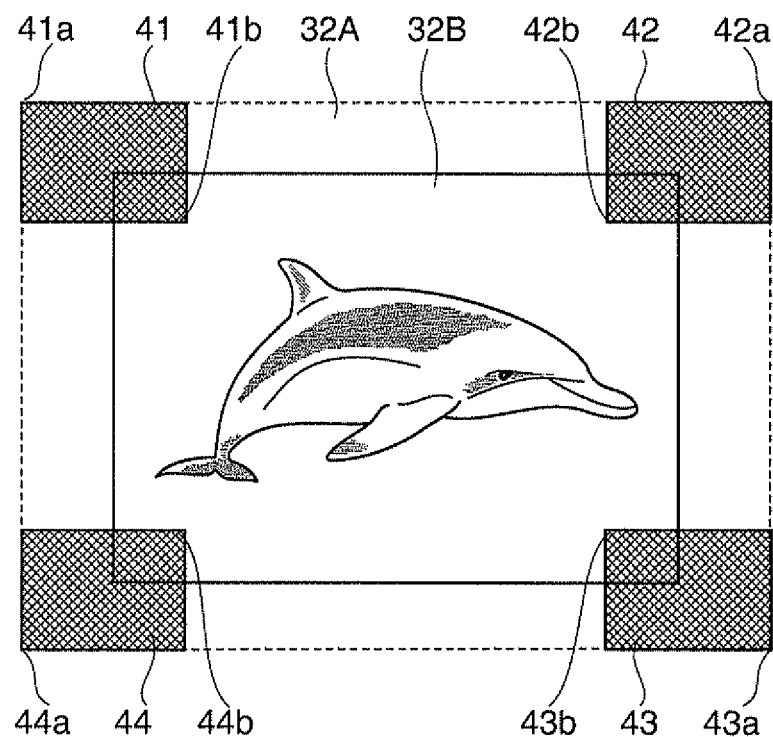
FIG. 11 is a diagram showing an example of correspondence between the display condition of the liquid crystal light valve and a projection image.

FIG. 11 is a diagram showing an example of the apex movable area displayed on the liquid crystal light valve 32. In the example shown in FIG. 11, there are displayed respectively on the four corners of the liquid crystal light valve 32 the four apex movable areas 41 through 44 (the areas provided with hatching) each having a rectangular shape. One apex (apex 41a, 42a, 43a, or 44a) of each of the apex movable areas 41 through 44 is disposed so as to overlap the respective one of the four apexes of the maximum pixel area 32A. Further, the apexes 41b through 44b located respectively at the orthogonal corners of the apexes 41a through 44a are disposed so as to overlap the apexes of the correction limit range (the minimum range in the case of executing the correction of shrinking the image) of the image forming area 32B. It should be noted that the correction limit range is set to be, for example, the range obtained by shrinking the maximum pixel area 32A to 70% thereof while keeping the aspect ratio. As a result, the apex movable areas 41 through 44 are set so as to have similar figures to the maximum pixel area 32A. It should be noted that it is possible to provide different setting to the correction limit range from the setting described above.

Figures 12A, 12B:
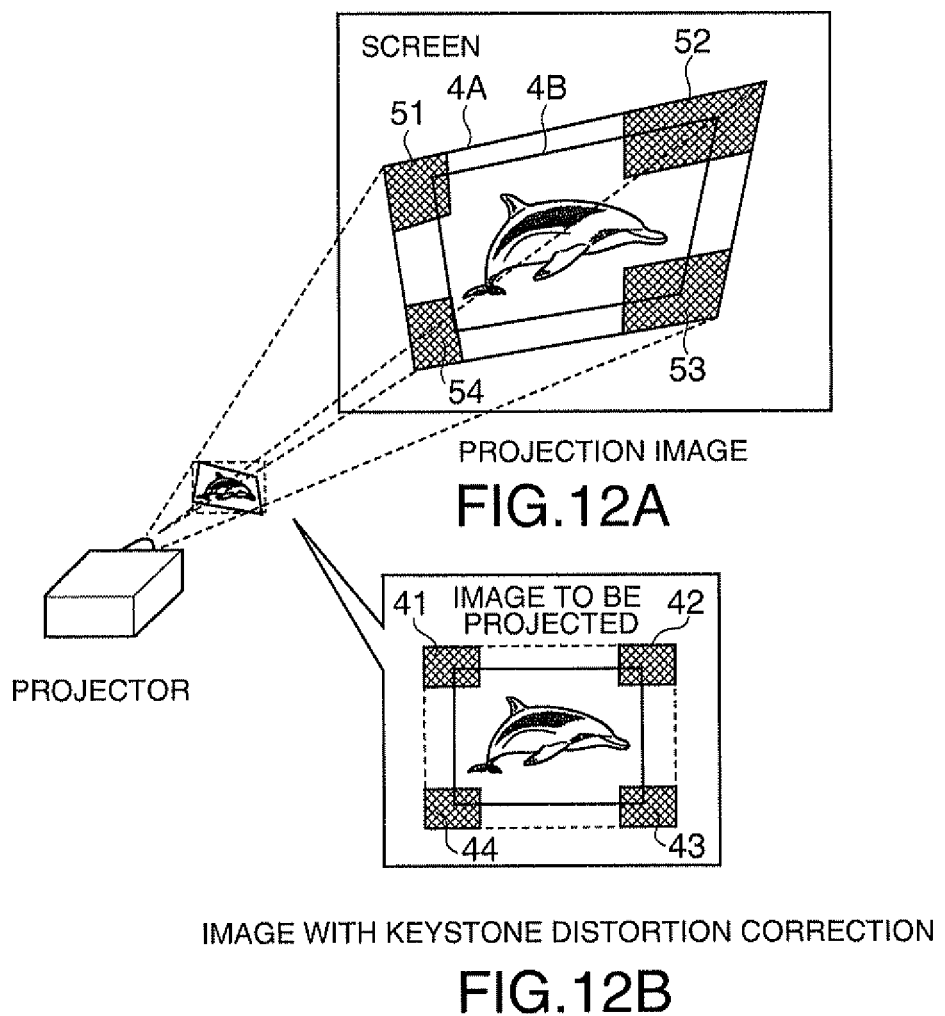
FIG. 12 is a diagram showing a condition of the liquid crystal light valve after the keystone distortion correction has been executed.

The apex movable areas 41 through 44 displayed on the liquid crystal light valve 32 in the manner as described above are projected on the screen 4. FIG. 12 is a diagram showing a relationship between the image displayed on the liquid crystal light valve 32 and the image projected on the screen 4. In the example shown in FIG. 12, the projector 10 is disposed so as to have tilts in the horizontal direction and the vertical direction, respectively, with respect to the screen 4. As a result, the maximum projection area 4A projected on the screen 4 becomes to have a quadrangular shape with the distortion instead of a rectangular shape as shown in FIG. 12A. Further, the image projection area 4B also becomes to have a quadrangular shape with the distortion in a similar manner. Further, on the four corners of, and inside the maximum projection area 4A, there are displayed the apex movable areas 51 through 54 provided with hatching. Still further, since the light transmitted through the peripheral area of the liquid crystal light valve 32 is projected on the area obtained by excepting the image projection area 4B from the maximum projection area 4A, the area becomes also visible.

In the step S4, the control section 11 determines whether or not either one of the apexes of the image is designated, and if it is designated, the process proceeds to the step S5. In the other cases, the same process is repeated. If, for example, the operation knob of the operation panel 13 or the remote controller 3 is operated to designate either one of the four apexes of the image, it is determined as Yes, and the process proceeds to the step S5.

In the step S5, the apex (hereinafter referred to as a "movement object apex") to be an object of movement designated in the step S4 is specified. If, for example, the apex on the upper right corner of the image is designated in the step S4, the apex on the upper right corner is specified as the movement object apex.

In the step S6, an amount of operation to the operation knob of the operation panel 13 or the remote controller 3 is detected. The period of time during which a predetermined operation knob (e.g., a cursor button) of the operation panel 13 is operated, for example, is detected as the amount of operation. Further, in the step S7, an amount of movement of the movement object apex is obtained based on the amount of operation (the operation time) obtained in the step S6 and a parameter (e.g., an amount of movement per unit time, which has previously been set), which has previously been set. For example, in the case in which the operation knob moving in the x-direction is operated for "0.2" second, if the amount of movement per unit time is a coordinate value of "50," "10" (=50×0.2) is obtained as the amount of movement in the x-direction.

In the step S8, whether or not the location of the apex after the movement is in the apex movable area is determined, and if it is in the apex movable area (Yes in the step S8), the process proceeds to the step S10. In the other cases (No in the step S8), the process proceeds to the step S9. If, for example, the apex runs out of the apex movable area, the process proceeds to the step S9, and in the other cases, the process proceeds to the step S10.

In the step S9, the control section 11 limits the location of the apex so that the location of the apex after the movement stays within the apex movable area. If, for example, the apex on the upper right corner is moved towards the center of the image forming area 32B, and runs out of the apex movable area, the location of the apex is limited so as to stay within the apex movable area. According to this process, each of the apexes is always controlled so as to stay within the apex movable area.

In the step S10, the control section 11 provides the keystone distortion correction section 23 with an instruction for executing the keystone distortion correction on the image data based on the amount of movement determined in the step S7 or the step S9. Specifically, the control section 11 provides the keystone distortion correction section 23 with the instruction for moving the movement object apex based on the amount of movement determined in the step S7 or the step S9, and deforming the shape of the image data so that the image is fitted into the area formed by the movement object apex after the movement and the other apexes. The keystone distortion correction section 23 executes the correction on the image data based on the instruction from the control section 11. It should be noted that since the correction is not executed on the apex movable areas 41 through 44, only the shape of the image data is deformed in response to the operation of the user.

The image data on which the correction is executed in the keystone distortion correction section 23 is supplied to the liquid crystal light valve drive section 24, and displayed on the liquid crystal light valve 32. The projection lens 33 projects the image, which is displayed on the liquid crystal light valve 32 in the manner as described above, on the screen 4. As a result, in the case in which the apex is moved, the shape of the image displayed on the liquid crystal light valve 32 is deformed, and the image projected on the screen 4 is deformed in accordance therewith.

In the step S11, whether or not an operation of determining the correction is made is determined, and if the operation of determining the correction is made (Yes in the step S11), the process proceeds to the step S12, In the other cases (No in the step S11), the process goes back to the step S4 to repeat the same operations as in the case described above. If, for example, the user operates the determination button of the operation panel 13 or the remote controller 3, the process proceeds to the step S12, and if, for example, an operation of further moving the apex is executed, or an operation of moving another apex is executed, the process goes back to the step S4 to repeat the same process as in the case described above.

In the step S12, the apex movable areas 41 through 44 are set to be in a nondisplay state. In other words, the control section 11 provides the keystone distortion correction section 23 with an instruction for setting the apex movable areas 41 through 44 to be in the nondisplay state. As a result, the keystone distortion correction section 23 sets the apex movable areas 41 through 44 to be in the nondisplay state. Thus, the apex movable areas 51 through 54 disappear from the screen 4.

Figure 10B:
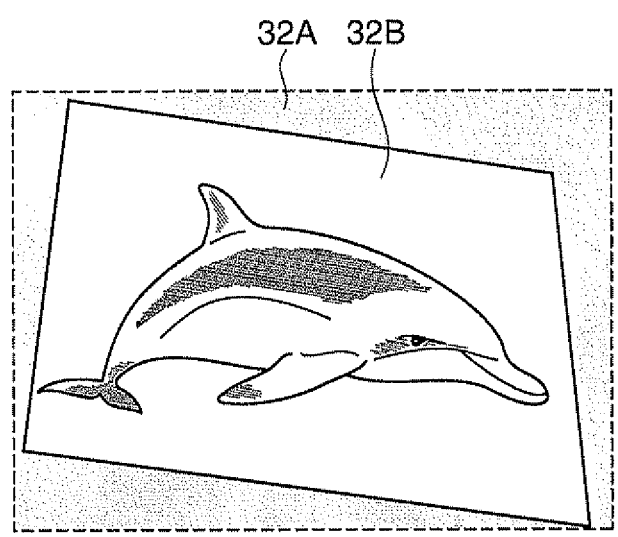

In the step S13, the peripheral area is set to be in the non-transmissive state. In other words, the control section 11 provides the keystone distortion correction section 23 with an instruction for setting the peripheral area to be in the non-transmissive state. As a result, since the information displayed on the liquid crystal light valve 32 becomes to have the peripheral area in the non-transmissive state as shown in FIG. 10B, the peripheral area is not projected on the screen 4, thus making the invisible state. In other words, only the image is projected on the screen 4. Then, the process is terminated.

According to the process described above, the image projected in the condition of having the keystone distortion as shown in FIG. 12 as an initial condition, for example, turns to be a rectangular state as shown in FIGS. 8A and 8B with each of the apexes adjusted.

As explained hereinabove, according to the embodiment of the invention, it is arranged that the apex movable areas 51 through 54 are displayed on the screen 4 when the keystone distortion correction is instructed, thereby clearly showing the range in which the apex can move. Therefore, the user can easily learn how to correct. For example, in the example shown in the part A of FIG. 12, since there is a little margin in the up-and-down direction (the vertical direction) although there is a sufficient margin in the lateral direction (the horizontal direction), it is possible to perform the keystone distortion correction while keeping the maximum projection size by performing the adjustment (so that the upper left apex and the lower right apex are located at the ends of the vertical width range) so that the image fits in the range in the vertical direction without a margin as shown in FIGS. 8A and 8B, and at the same time appropriately adjusting the length of the image in the lateral direction.

Figure 13A:
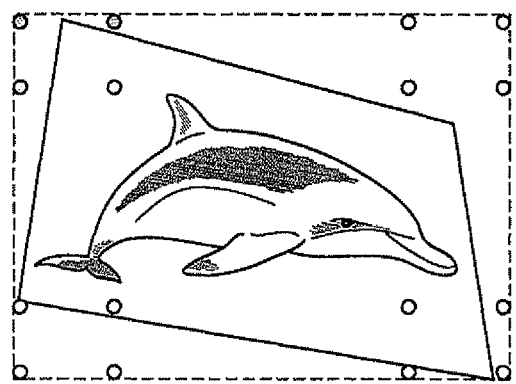
FIGS. 13A through 13C are diagrams showing other examples of the apex movable area.
Figure 13B:
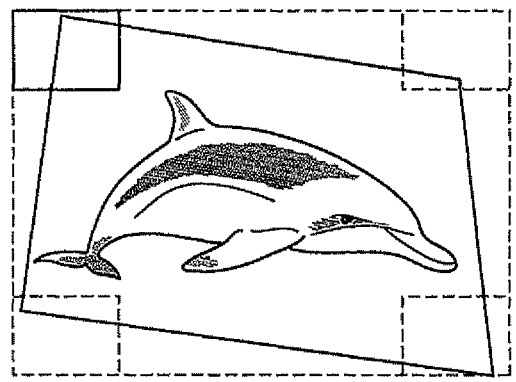
Figure 13C:
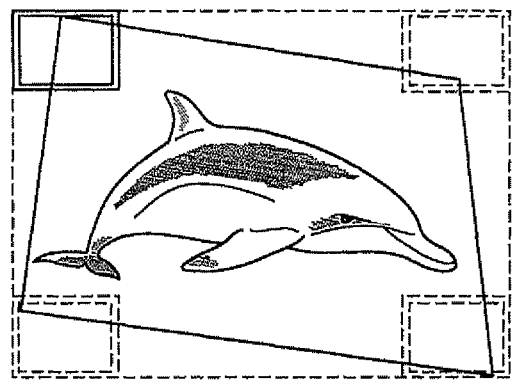

Although the invention is explained hereinabove based on the embodiment, the invention is not limited to the embodiment. For example, although in the embodiment described above it is arranged to display the apex movable areas 51 through 54 as the areas with hatching, there are various alternative forms of display. For example, as shown in FIG. 13A, it is possible to display marks (circles in the example shown in FIG. 13A) indicating the apexes of the apex movable areas. It should be noted that in the example shown in FIG. 13A, the circles of the apex movable area to which the apex as the adjustment object belongs have a different display color, thus the adjustment object is expressed clearly. It should be noted that it is also possible to arrange to blink the circles, for example, instead of making the display color different. FIG. 13B shows an example of displaying rectangles indicating the apex movable areas, and further displaying the rectangle as the adjustment object with solid lines and the other rectangles with broken lines. Further, FIG. 13C is an example of displaying the rectangles shown in FIG. 13B with double lines instead of the single lines. By thus displaying the rectangles with the double lines, the boundaries become clearer.

Figure 14A:
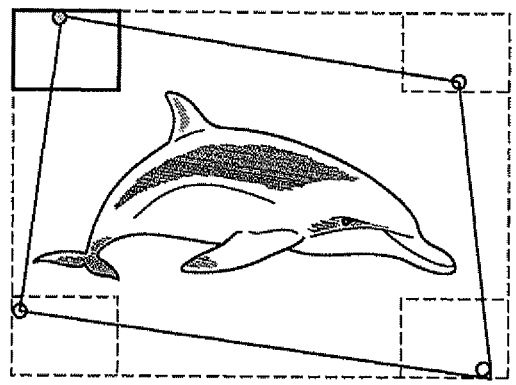
FIGS. 14A through 14C are diagrams showing other examples of the apex movable area.
Figure 14B:
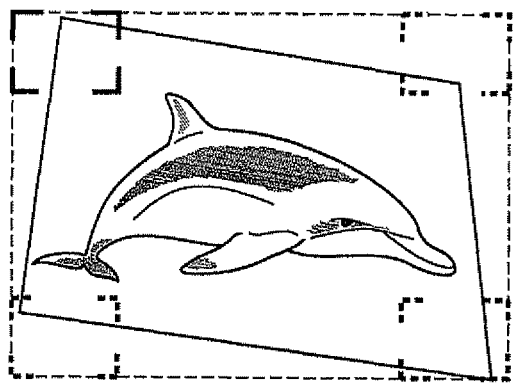
Figure 14C:
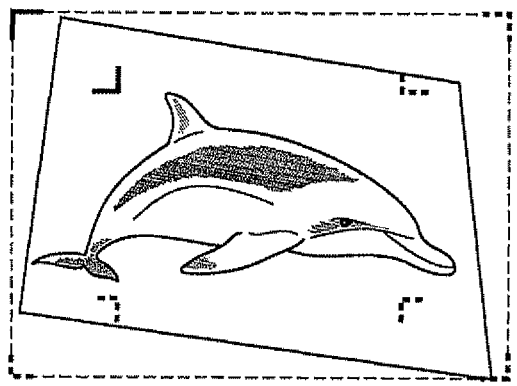

FIG. 14A shows a similar display example to that shown in FIG. 13B, in which figures (circles in the example) for indicating the apexes of the image are displayed. It should be noted that in the present example the movement object apex of the image is highlighted while the other apexes are displayed normally. By thus displaying the figures indicating the apexes, it becomes possible to make the adjustment point clearer, and to clearly show the present positions of the apexes in the respective apex movable areas. FIG. 14B is an example of displaying angle brackets indicating the four apexes of each of the apex movable areas. Further, FIG. 14C shows an example of displaying only the angle brackets existing at locations corresponding to the apexes of the maximum pixel area 32A and the apexes of the correction limit range in the example shown in FIG. 14B. As shown in FIGS. 14B and 14C, by arranging that the angle brackets clearly indicating the locations of the apexes are displayed, it becomes possible to clearly show the movable range without degrading the visibility compared to the case of displaying the quadrangles.

Figure 15A:
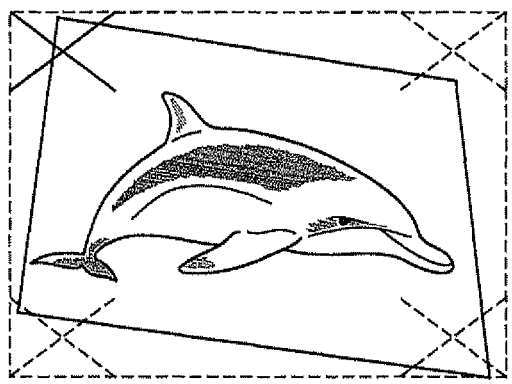
FIGS. 15A through 15C are diagrams showing other examples of the apex movable area.
Figure 15B:
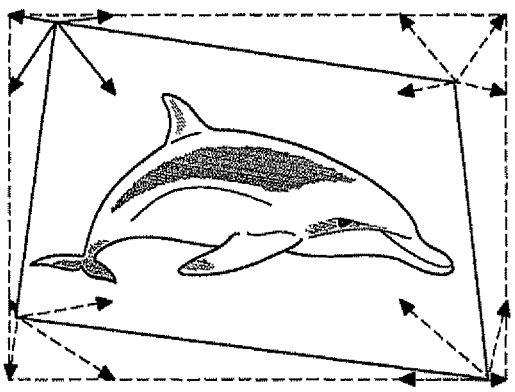
Figure 15C:
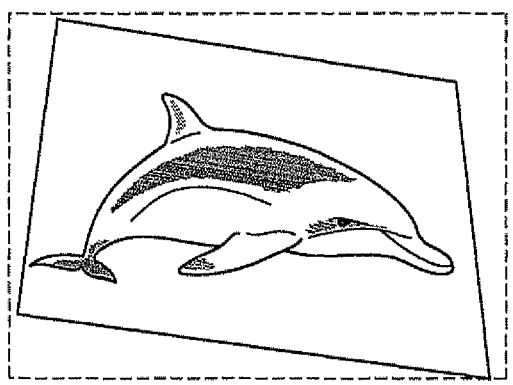

FIG. 15A shows an example of displaying the diagonal lines of the apex movable areas. By thus showing the diagonal lines, it becomes also possible to show the movable range of the apexes. Further, FIG. 15B shows an example of displaying the arrows connecting each of the apexes of the image and the apexes of the apex movable area of the corresponding one of the apexes of the image. In this example, when moving the apex, the arrows also move concomitantly, and therefore it is possible to figure out the movable range from the present location more accurately. FIG. 15C shows an example of clearly showing only the peripheral area without showing the apex movable area clearly. Specifically, in the case shown in FIG. 15C, the area (the peripheral area) obtained by excepting the image forming area 32B from the maximum pixel area 32A is set to be in the transmissive state instead of the non-transmissive state. Therefore, the area corresponding to the peripheral area is displayed on the screen 4. In such a method, only the maximum area of the apex movable area can be learned, and by referring to such a display, the keystone distortion correction of the image becomes possible.

It should be noted that although in the present embodiment the case in which the maximum pixel area 32A of the liquid crystal light valve 32 has a horizontally long rectangular shape is explained, any shape can be adopted as the shape of the maximum pixel area 32A, and a vertically long rectangular shape can also be adopted in order for providing freedom to the location of the image forming area 32B in the vertical direction. Further, although in the embodiment described above, the configuration in which the optical axis 10L of the projector 10 and the center of the maximum pixel area 32A match with each other is illustrated and explained, it is also possible to adopt a configuration capable of moving the maximum pixel area 32A relatively to the optical axis 10L.

Further, although in the embodiment described above it is arranged that the four apexes are adjusted individually, it is also possible to perform adjustment with respect to the sides instead of the apexes. Even in such a case, the adjustable range becomes clear by displaying the apex movable area.

Further, although in the flowchart shown in FIG. 9 it is arranged that the apex is moved at a time in accordance with the amount of movement, it is also possible to move the apex gradually instead of moving the apex at a time. In such a case, when the operation of movement is made, the image is continually corrected in response to the operation while the apex exists in the apex movable area, and the deformation of the image is stopped when the boundary of the apex movable area is reached. According to such a method, the keystone distortion correction can also be performed.

Further, although in the description of the embodiment the case in which the pixels are arranged in the liquid crystal light valve 32 in a matrix is explained, a configuration having the pixels arranged to form a honeycomb structure can also be adopted. Further, although in the above description of the embodiment, the configuration of using the liquid crystal light valve 32 equipped with the transmissive liquid crystal display panel is explained, the invention is not limited thereto, but a reflective liquid crystal display panel, for example, can be used as the liquid crystal light valve 32, or a digital mirror device (DMD (a registered trademark) or the like can also be used instead of the liquid crystal light valve 32. The pixel arrangement of the reflective liquid crystal panel and the digital mirror device can be a matrix or a honeycomb structure.

In addition, although in the above description of the embodiment the example of projecting the image towards the screen 4 implemented outside the projector 10 is explained, a configuration of projecting the image to the transmissive screen 4 implemented integrally in the housing of the projector 10 can also be adopted as in so-called rear-projection display device, for example. Further, the projector 10 can be applied to an electronic apparatus provided with the function of projecting the image besides the rear-projection display device. Further, it is obvious that a configuration of housing the image supply device 2 and the projector 10 integrally in the same housing can be adopted.

Further, although in the explanation described hereinabove the case in which the control program for realizing the function of the projector 10 is stored in the storage section 12 is described, it is possible to record the control program on a semiconductor recording medium such as a RAM or a ROM, a magnetic storage recording medium such as an FD or an HD, an optical read-out recording medium such as a CD, a CDV, an LD, or a DVD, or a magnetic recording/optical read-out recording medium such as an MO, and any type of recording medium can be adopted irrespective of the read-out method provided that the recording medium is computer-readable. Further, there can also be adopted a configuration of realizing the function described above by reading out and executing the control program recorded on such a recording medium by the control section 11, or by further providing a network interface as a communication interface in the projector 10 and downloading the control program by the network interface via the network to execute the control program. Further, it is also possible to adopt a configuration of providing the network interface in the image supply device 2, and downloading the image data by the network interface via the network to output the image data to the projector 10, and it is obvious that other specific configurations can arbitrarily be modified within the range in which the scope of the invention is not diminished.

The entire disclosure of Japanese Patent Application No. 2008-036979, file Feb. 19, 2008 is expressly incorporated by reference herein.

What is claimed is:

1. A projector that projects an image based on image data comprising:
an operation signal processing section that detects an operation; and
a keystone distortion correction section configured to perform a keystone distortion correction on the image to be projected, such that under a condition that the keystone distortion correction on the image is performed by moving an apex of the image in response to the operation detected by the operation signal processing section independently from other apexes of the image, the image and at least one area indicating a correction range of the keystone distortion correction are projected, the at least one area including an apex of a maximum pixel area that can be projected and an apex of an image forming area of the image.

2. The projector according to claim 1, further comprising:
a light modulation section having a plurality of pixels arranged, which modulates light from a light source by the pixel, and
a figure indicating an apex of a maximum pixel area that is a maximum area in which the image can be formed on the light modulation section and an apex of a correction limit range indicating a limit range of a correction for shrinking the image being projected as the area indicating a correction range.

3. The projector according to claim 1, further comprising:
a light modulation section having a plurality of pixels arranged, which modulates light from a light source by the pixel, and
an area including an apex of a maximum pixel area that is a maximum area in which the image can be formed on the light modulation section and the apex of the correction limit range indicating a limit range of a correction for shrinking the image being projected as the area indicating a correction range.

4. The projector according to claim 1,
a figure indicating the apex of the image which can move under the condition that the keystone distortion correction is performed being projected.

5. The projector according to claim 1,
under the condition that the keystone distortion correction is terminated, the area indicating a correction range being set to be in a non-projection state.

6. An electronic apparatus comprising the projector according to claim 1.

7. The projector according to claim 1,
the operation signal processing section detecting the operation in a remote controller and generating an operation signal corresponding to the operation of the remote controller to output to a control section.

8. The projector according to claim 1,
the keystone distortion correction on the image being performed by moving an apex of the image to adjust the shape of boundaries of the image, the adjustment of the shape of the boundaries of the image being within the area including the apex of the maximum pixel area that can be projected and the apex of the image forming area.

9. The projector according to claim 8, wherein adjusting the shape of the boundaries includes performing the adjustment so that a first portion of the image disposed within a first area indicating a correction range of the keystone distortion correction is adjusted to contact a part of an apex of a maximum pixel area of the first area that can be projected, and a second portion of the image disposed diagonal of the first portion and within a second area indicating a correction range of the keystone distortion correction is adjusted to contact a part of an apex of a maximum pixel area of the second area that can be projected.

10. A method of controlling a projector that projects an image based on image data, the method comprising:
    detecting an operation, and
    projecting, under the condition that a keystone distortion correction on the image is performed by moving an apex of the image in response to the detected operation independently from other apexes of the image, the image and at least one area indicating a correction range of the keystone distortion correction, the at least one area including an apex of a maximum pixel area that can be projected and an apex of an image forming area of the image.

11. The method of controlling a projector according to claim 10, the method further comprising:
    modulating light from a light source by the pixel, and
    projecting a figure indicating an apex of a maximum pixel area that is a maximum area in which the image can be formed on the light modulation section and an apex of a correction limit range indicating a limit range of a correction for shrinking the image as the area indicating a correction range.

12. The method of controlling a projector according to claim 10, the method further comprising:
    modulating light from a light source by the pixel, and
    projecting an area including an apex of a maximum pixel area that is a maximum area in which the image can be formed on the light modulation section and the apex of the correction limit range indicating a limit range of a correction for shrinking the image as the area indicating a correction range.

13. The method of controlling a projector according to claim 10, the method further comprising:
    projecting a figure indicating the apex of the image which can move under the condition that the keystone distortion correction is performed.

14. The method of controlling a projector according to claim 10, the method further comprising:
    indicating, under the condition that the keystone distortion correction is terminated, the area a correction range is set to be in a non-projection state.

* * * * *